United States Patent [19]

Theys et al.

[11] Patent Number: 5,255,337
[45] Date of Patent: Oct. 19, 1993

[54] SPLICE CASE FOR OPTICAL FIBRE CABLE

[75] Inventors: Karel F. W. Theys, Tielt-Winge; Etienne R. Laeremans, Scherpenheuvel-Zichem, both of Belgium

[73] Assignee: N.V. Raychem S.A., Belgium

[21] Appl. No.: 8,227

[22] Filed: Jan. 19, 1993

Related U.S. Application Data

[63] Continuation of Ser. No. 721,587, Jul. 17, 1991, abandoned.

[30] Foreign Application Priority Data

Jan. 17, 1989 [GB] United Kingdom ............... 8900932

[51] Int. Cl.$^5$ ................................................ G02B 6/35
[52] U.S. Cl. ............................................................ 385/135
[58] Field of Search ............ 385/76, 95, 99, 135–137, 385/139

[56] References Cited

U.S. PATENT DOCUMENTS

| | | | |
|---|---|---|---|
| 3,557,299 | 1/1971 | Dienes | 174/38 |
| 3,614,295 | 10/1971 | Gillemot et al. | 174/87 |
| 3,725,581 | 4/1973 | Gillemot et al. | 174/38 |
| 3,919,460 | 11/1975 | Neall et al. | 174/87 |
| 4,320,938 | 3/1982 | Gunnersen et al. | 350/96.21 |
| 4,373,776 | 2/1983 | Purdy | 350/96.20 |
| 4,717,231 | 1/1988 | Dawes et al. | 350/96.20 |
| 4,743,088 | 5/1988 | Bainssay et al. | 350/96.20 |
| 4,761,052 | 8/1988 | Buekers et al. | 350/96.20 |
| 4,913,522 | 4/1990 | Nolf et al. | 385/135 X |

FOREIGN PATENT DOCUMENTS

| | | |
|---|---|---|
| 0068781A3 | 1/1983 | European Pat. Off. . |
| 0094848A2 | 11/1983 | European Pat. Off. . |
| 0159857A2 | 10/1985 | European Pat. Off. . |
| 0216073 | 4/1987 | European Pat. Off. . |
| 0267028A2 | 5/1989 | European Pat. Off. . |
| 0159857B1 | 7/1990 | European Pat. Off. . |
| 2131830 | 12/1972 | Fed. Rep. of Germany . |
| 3125044A1 | 1/1983 | Fed. Rep. of Germany . |
| 3706518A1 | 9/1988 | Fed. Rep. of Germany . |
| 1472254 | 5/1977 | United Kingdom . |
| 2104313B | 3/1983 | United Kingdom . |
| 2165661A | 5/1986 | United Kingdom . |
| 2176024A | 12/1986 | United Kingdom . |
| 2188747A | 10/1987 | United Kingdom . |

Primary Examiner—Akm E. Ullah
Attorney, Agent, or Firm—Herbert G. Burkard; A. Stephen Zavell

[57] ABSTRACT

A cable splice enclosure comprising: a base having an outlet capable of receiving a cable; and a hollow cover which can be fixed to the base to close at least partially the enclosure such that adjacent external surfaces of the base and cover lie substantially mutually flush; in which the base and the cover have means which can prevent their separation, said means lying substantially flush with or below said adjacent external surfaces.

20 Claims, 7 Drawing Sheets

SPLICE CASE FOR OPTICAL FIBRE CABLE

This application is a file wrapper continuation of application Ser. No. 07/721,587, filed Jul. 17, 1991, now abandoned.

The present invention relates to the provision of an environmental seal around a splice in one or more optical fibre or other cables.

Optical fibre cables comprise a bundle of optical fibres surrounded by a protective jacket. Since such cables are manufactured in finite lengths, any installation will in general require separate lengths of cable to be spliced together. A problem arises at the splice, not only in forming fibre splices of low light attenuation, but also in replacing the protective jacket which has to be removed in the region of the splice to expose the fibres. It is with this second problem that the present invention is concerned.

Splicing an optical fibre is a difficult business, requiring use of a machine for proper alignment of pairs of fibres before a permanent splice is made between each pair. The machine will of necessity be some short distance away from the ends of the intact portions of the cables to be joined, i.e. some distance from the ends of each cable jacket. The jacket of each cable to be joined may be stripped back a distance of, say, 1.5 m thereby exposing 1.5 m of optical fibres. It can be seen, therefore, that there is a further problem, namely the accommodation of a significant length of optical fibres within the environmental housing which is to replace the removed portions of cable jacket. Optical fibres are easily broken by being bent around too sharp a radius, and the housing must therefore provide some way of organizing the fibres along an acceptable path.

There are some further considerations. It will generally be desirable that any chosen fibre within the housing be accessible, and therefore the fibres, which may number hundreds, should be organized within the housing in a regular fashion. Also, some means of identifying each fibre is desirable, and such means may have to be by way of its location within the housing since colour coding of the fibre itself is difficult.

Various suggestions have been proposed for an optical fibre splice case which organizes the slack lengths of fibres and provides an environmentally sealed housing around them.

In European patent publication 0043570 there is proposed an optical fibre splice case through one side of which one cable enters and through an opposite side of which another cable enters. The ingoing cables are sealed to inlets of the case by shrinkable sleeves. Within the case is a series of plates, each with projections thereon around which are wound the spliced fibres, thereby storing the slack lengths in a path which does not result in damage to the fibres. Such a splice case is known as an in-line splice case (as opposed to a butt splice case) since the cables enter the case from opposite ends, or at least from widely spaced positions.

European patent publication 0159859 (Raychem) discloses an enclosure capable of enclosing a butt splice between at least two optical fibres, which comprises:
- a base having at least two mutually adjacent outlets capable of receiving respective cables;
- at least one optical fibre organizer attachable to the base and capable of storing a plurality of optical fibres in a path from one of the outlets to another of the outlets, said path having a minimum radius of curvature no smaller than the minimum bend radius of said optical fibre; and
- a hollow cover, preferably dome-shaped, which can surround the organizer and which can be fixed to the base to close the enclosure.

DE2131830 (Rose), DE3125044 (Rose), US3557299 (Dienes), FR2158526 (Reliable), US3728467 (Klagum), US3725581 (Gillemot) and EP094848 (Raychem) also disclose cable enclosure shaving a base and a generally dome-shaped cover, but principally for connecting copper cables. An advantage of these designs is that they allow ready access to the cable splice simply by removing the cover from the base.

We have discovered an improvement to such designs allowing, where desired, improved mechanical connection between the two parts, and easier environmental sealing. In particular the present invention provides interlocking between base and, cover, simple means for securing the parts in a locked configuration, and smooth, generally cylindrical outer surfaces at the point, preferably entirely convex, especially circular in cross-section, over which a shrinkable sleeve (for example a narrow band) can be shrunk to form an environmental seal.

Thus, the present invention provides a cable splice enclosure comprising:
- a base having an outlet capable of receiving a cable; and
- a hollow cover which can be fixed to the base to close at least partially the enclosure such that adjacent external surfaces of the base and cover lie substantially mutually flush;
- in which the base and the cover have means which can prevent their separation, said means lying substantially flush with or below said adjacent external surfaces.

The invention further provides a joining device which comprises a first hollow part having a generally cylindrical portion comprising first axially-extending projections, the projections having generally circumferentially-extending first recesses in external surfaces thereof;
- a second hollow part having a generally cylindrical portion comprising second axially-extending projections, the projections having generally circumferentially-extending second recesses in external surfaces thereof; the first hollow part being capable of being fixed to the second hollow part with the first and second projections mated in interdigitated fashion, with the first an second recesses lying on a common circle; and
- a ring that can be positioned in the first and second recesses to prevent axial separation of the first and second parts.

An enclosure of this design can be made easy to reenter because an end (i.e. the cover), rather than a middle portion, of the assembly can be removed. This is because the cables to be spliced enter the assembly from one end. The assembly can be of substantially tubular design of small diameter and length, the design of the internal organizer can be simplified, and a temporary seal (e.g. over night during a lengthy installation) around the organizer can be made using the cover rather than a wrap-around sheet. Furthermore, the assembly can be easily removed from a manhole or pole. This is because sufficient free cable will be available due to one of the ingoing cables having been bent in a curve in order to enter the assembly. (Imagine two horizonal cables to be spliced; one enters the assembly directly, and the other will curve through a semi-circle to enter the same end of the assembly.) If an in-line cable splice is used, there is either no cables slack at all and the splice cannot be moved; or the cable needs to curve at both ends requiring a larger man-hole or more extensive cable pole fixings.

The base preferably comprises a plate having two or more outlets, either as simple apertures or as tubular projections, and the cover preferably is generally cylindrical with one closed end, for example dome-shaped. The base plate mates with the open end of the dome to provide the hollow article.

The base is preferably so constructed to allow core blocking of the cables that pass through it. This may be done by providing a reservoir or means for constructing a reservoir into which an encapsulant can be pored or pumped. A portion of each cable stripped of its outer jacket passes through the reservoir such that introduction of an encapsulant, which may cure or otherwise solidify, provides core blocking or further seals the cable outlet, or screens the spliced fibres from any metal work present.

The outlets are preferably in the form of tubes protruding from the base (or other part) of the hollow article, and means is preferably provided for environmentally sealing the outlets to the cables that pass through them. For example, a clamp, such as a hose clamp, could be used around the tubular outlets. A second possibly is to provide an adhesive, a mastic, or other sealing material between the cables and the outlets. We prefer, however, that the outlets be heat-shrinkable or otherwise recoverable since a tight seal can thus be made between any given outlet and a wide variety of sizes of cables. Heat-recoverability may of course be used in conjunction with a sealing material such as a heat-activatable adhesive.

In general, the two or more outlets may be provided in two basic ways. Firstly they may be independent in the sense that the base (or other part) of the hollow article is moulded or otherwise formed with tubular outlets projecting therefrom at two or more separate positions. In a second technique one (or more) large outlet is provided on the hollow article, which is subsequently divided into the requisite number of smaller outlets; or, what may amount to the same thing, means is provided to obviate the re-entrant gaps that would otherwise provide leak paths between the two or more cables and the large conduit that carries them. This may be done either by providing a flexible seal around the two or more cables to change their combined re-entrant cross-sectional shape into a generally circular shape compatible with that of the outlet, or by using a branch-off clip (such as that disclosed in GB 1604981 or 1604985) to deform the outlet to match the cross-sectional shape of the cables. (These techniques are illustrated in the drawings.)

Whether or not independent conduits or a divided large conduit is used, a seal is preferably made or enhanced by the conduits or conduit being recovered into engagement with the cable or cables. Recovery is preferably brought about by heat. Heat may be supplied by a torch or a hot-air gun although neither of them can supply heat sufficiently locally to recover easily one only of several independant conduits. We prefer therefore to provide self-contained heating means.

The self-contained heating means preferably comprises an electrical heating means such as a resistive heating wire or a conductive polymer composition. We prefer that the electrical heating means is self-regulating with respect to temperature, and this may be achieved by using as the heater a polymeric composition loaded with a filler such as carbon to give a positive temperature coefficient of resistance. The heater may be a discrete heater in thermal contact with the recoverable outlets, or it may be integral with the outlets. Additionally or alternatively, the heater may have the function of activating a heat-activatable sealing material such as a hot-melt adhesive for further environmental sealing or engagement.

A preferred design of the optical fibre organizer will now be considered. The organizer preferably comprises one or more trays on each of which may be stored a length of one or more optical fibres. For example, an organizer may have 5 to 10, preferably about 8 or 10, trays, and each tray may store 5-24, preferably about 10 or 12, optical fibres. An optical fibre cable enters the assembly through one outlet, intermediate lengths of the fibres it contains are stored on the trays, and the cable leaves the assembly through another of the outlets. Since the primary function of the assembly is to house a cable splice, each tray will also hold the fibre splices themselves. A fibre splice may be made in a small transparent tube into each end of which is inserted one of the two fibres to be spliced. The tube contains a curable composition, which is caused to set once the fibres have been correctly aligned therein. The trays may be provided with means such as recesses or clips to hold these fibre splice tubes. The assembly of the invention may also be used to house an intermediate section of a cable, where the jacket has been removed for testing or access, and where no fibre splices are present.

The trays are preferably stacked one on top of another and attached in that configuration to a carrier which may be attached to or integral with the base or other part of the enclosure. The attachment should be such that any chosen tray may be removed or exposed in order to attend to an optical fibre it carries.

We prefer that the trays are rectangular and are attached by means of a short side to a base of the enclosure. The trays may be hinged in order that they can be rotated away from the splice closure axis. The series of hinges preferably follows a stepped pattern, i.e. lies along a line that is oblique to the planes in which the trays normally lie (this is illustrated in the drawings). In particular they may be hinged along an edge, preferably a short edge, so as to be moveable to expose an underlying tray. The trays then extend lengthways away from the base and are covered by the cover.

The invention further illustrated with reference to the accompanying drawings, in which.

The parts illustrated in FIGS. 1-7 may be used in the present invention by combining any one or more of their features with any of the features of the interlocking parts shown in FIGS. 8-11.

Figure 1:
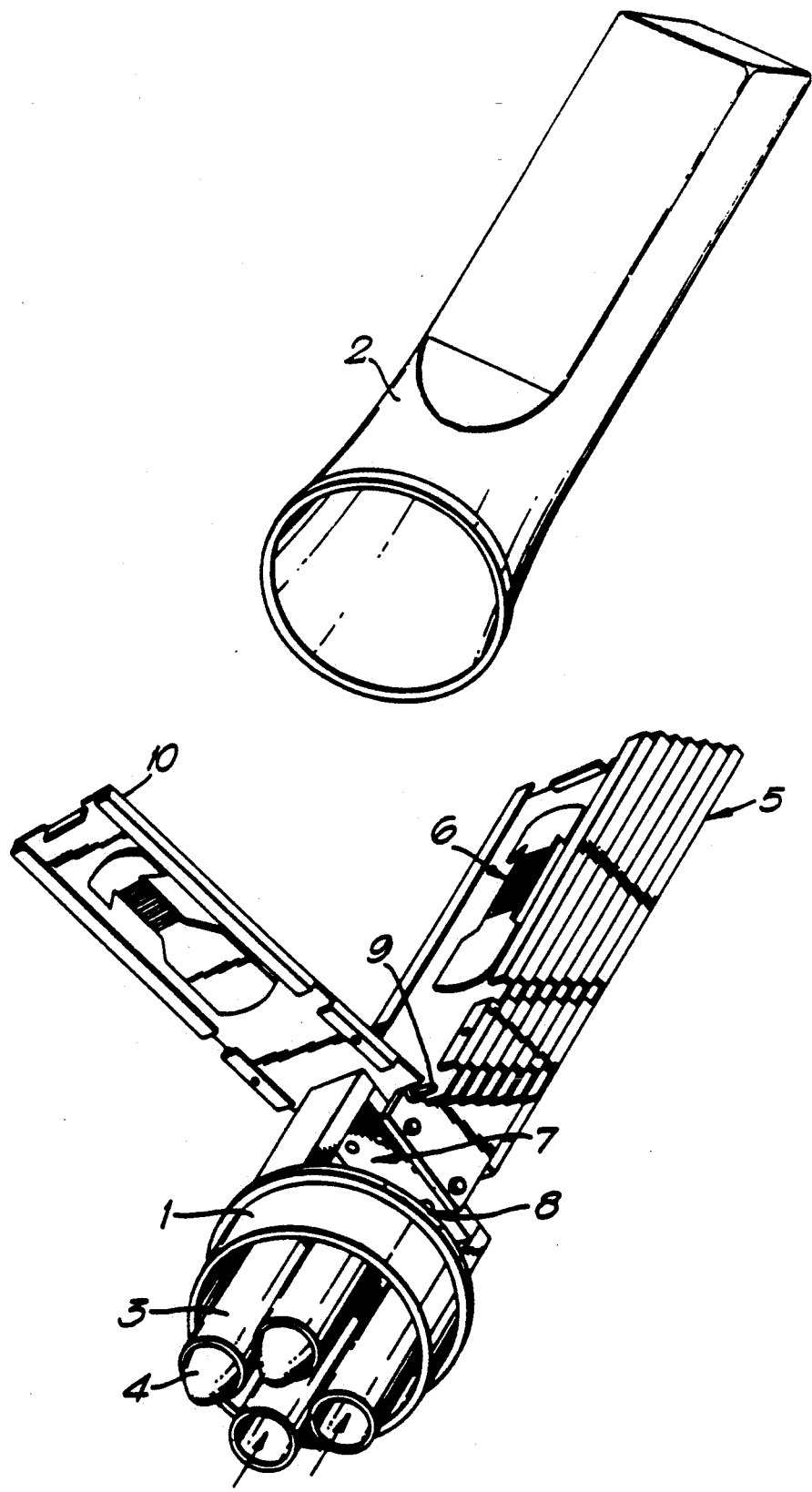
FIG. 1 shows a partially dismantled prior art butt splice case in which base and cover simply abut.

FIG. 1 shows a prior art base plate 1 and a dome-shaped cover 2 which together form an enclosure for use as a butt splice case for optical fibre cables. The base 1 is preferably manufactured by molding from a glass-fibre filled high density polyethylene. Outlets 3 are provided in the base through which the cables pass. On a new installation, some only of the outlets 3 maybe required, and some may therefore be temporarily blocked as shown at 4. Such blocking may be by any suitable means, but we prefer that the outlets be made with closed ends which are simply cut off as required. The dome-shaped cover may be blow-moulded and incorporate a moisture-vapor barrier such as a metal foil.

The hollow article contains an optical fibre organizer which comprises a series of trays 5. Each tray preferably includes means 6 for accommodating splice tubes which house the fibre splices. The trays are preferably held in an orderly fashion on a carrier 7 which is fixed to the base 1. The trays are shown hinged along their short edges, but other hinging for example pivoting for rotation e.g. about one corner in the plane of the trays could be provided. The hinging allows chosen trays to be exposed for installation of the splices or for repair etc. Means is preferably also provided for locking the trays in their hinged position.

The assembly of the invention may be used as follows. Firstly, pass the two cables to be spliced in the direction of the arrows through two of the outlets 3 such that, say 1.5 m of each cable protrudes into the splice case. The cable jackets are then removed back to the base 1 to expose 1.5m of fibres. The strength core of each cable is then cut back, leaving enough remaining for it to be fastened into respective fastening holes 8. Each fibre of one cable is then spliced to the correct fibre of the other cable. Groups of say ten or twelve spliced fibres are then stored on each tray. When one tray is filled it is moved by hinging at 9 to expose another tray. Each tray preferably has a rim 10 to ensure a sufficient separation between adjacent trays and/or to prevent fibre slippage from each tray.

In FIG. 1 the outlets 3 are shown as independant tubular projections, which are preferably produced by molding integrally with the base. The outlets are preferably heat-shrinkable in order that seals can be made to the cables they carry.

Figure 2A:
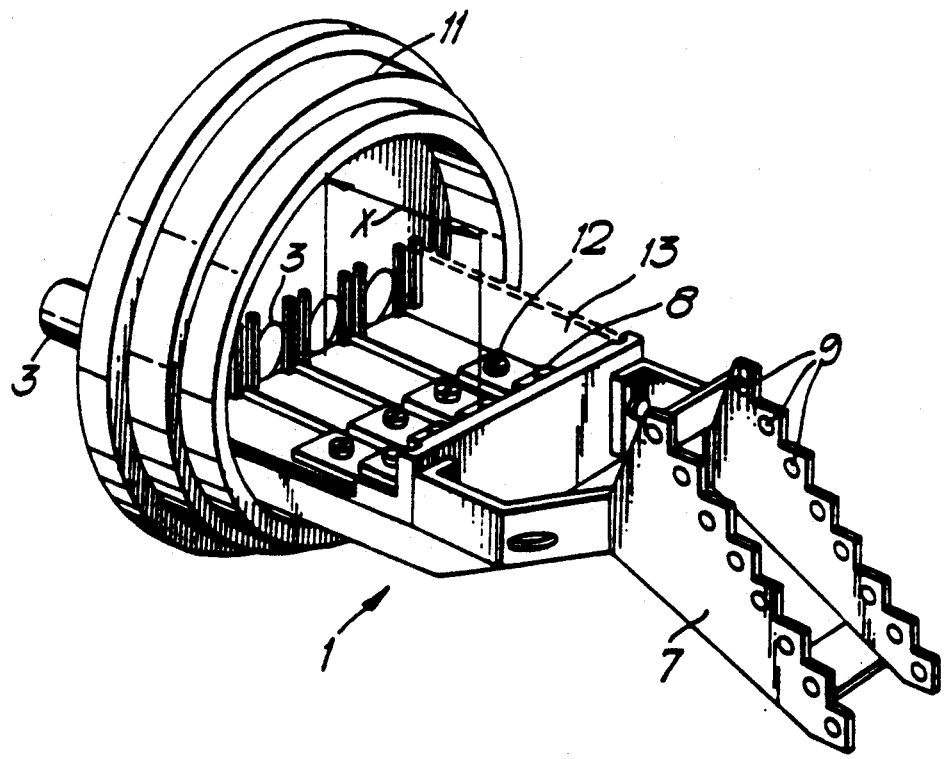
FIGS. 2a and 2b show bases for an optical fibre splice case.

The base 1 shown in FIG. 2a has some additional or alternative features to that shown in FIG. 1. This base 1 comprises a moulded or otherwise formed part 11 to which is attached a carrier 7 to which trays may be hinged at positions 9. Cables enter the base through outlets 3. Provision is made for connecting (mechanically and/or electrically) a central core of the cable and/or a cable shield or outer strength member (for example a braid or tape wrap): the central strength member can be attached to connections 8 and the outer strength member (or shield) to connections 12. A connection 8 and connection 12 may be provided for each cable.

The base is so constructed that core blocking of the cables can be provided. A certain length of cable jacket is removed so that, when the cable is inserted through an outlet 3, the cable core is exposed over at least part of the distance X shown in the Figure.

A reservoir may be provided by plates or other means 13 which can be attached, for example by positioning in grooves on the base. An encapsulant may then be poured or forced into the reservoir to block the cable or to form a further seal at the cable outlet (i.e. in addition to the sleeves 3) or to protect the interior of the splice case from any metal work present (metal may cause liberation of hydrogen which can damage optical fibres).

Figure 2B:
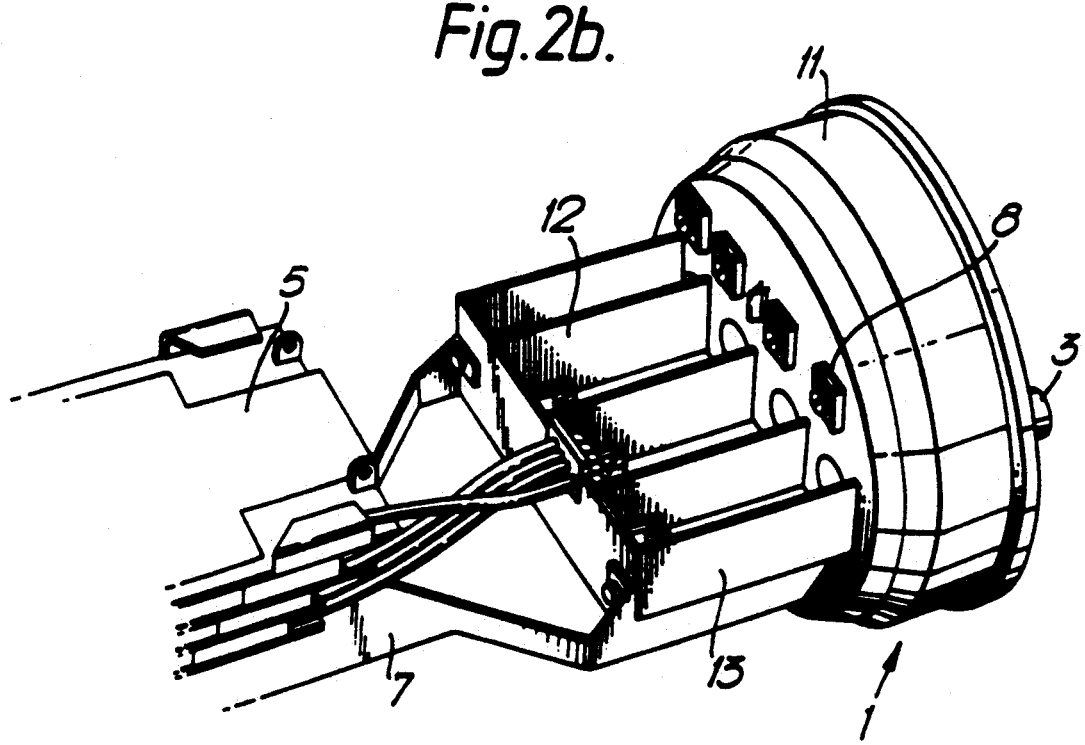

A further variation is shown in FIG. 2b, which shows several partially drawn trays 5 attached to a base 1 comprising a moulded part 11 and a carrier 7. In this embodiment connectors 8 for cable shielding or for outer strength members are attached to the moulded part. This can provide easy cable installation and easy fibre access. The dotted lines between connectors 8 indicate an electrically conductive strip between them that can be severed for example where it is shown pleated to isolate the two connectors at the left from the two at the right.

The tray partially shown, is of a design that allows the tray size to be minimized. Such trays can preferably hold splices of, say, 7.2 mm in width. Bend radii of at least 4.4 cm can easily be accommodated, allowing storage of monomode fibres.

In FIG. 2b a single means 13 provides reservoirs for encapsulant for all of the cables simultaneously. Such means may be an integrally moulded part of the base.

A termination system is provided to aid branching of fibres or groups of fibres from the incoming cable to respective trays. The termination system illustrated comprises a series of tubes into which fibres can be fed running from the base to respective trays. The tubes may be held in groups (of say four) on a part of the base by a clip as shown.

The bases of FIGS. 2a and 2b may be used in in-line splice cases.

Figure 3:
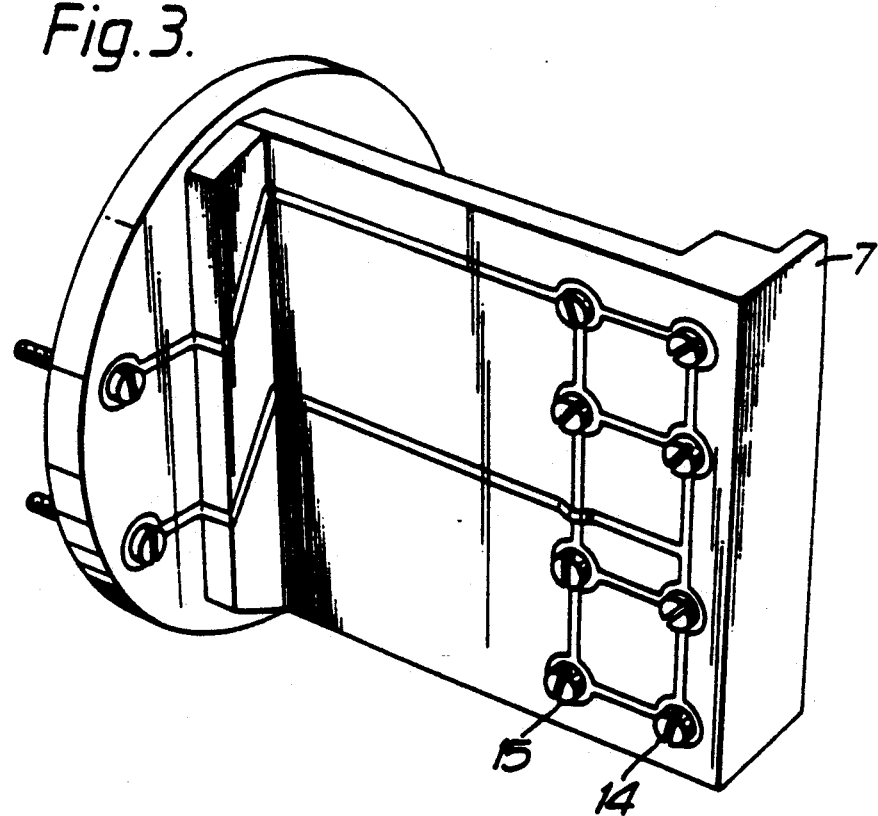
FIG. 3 shows electrical connections to the base of FIG. 2.

FIG. 3 shows an underneath view of the bases shown in FIG. 2. Electrial connections are shown to the sets of contacts 14 and 15. The connections are made such that selective cutting of them can result in any of the following: all cable central conductors and shields connected to the same point (or points); central conductors plus shields of respective cables to different points 3; and all central conductors to one point, and all shields to another point.

Figure 4:
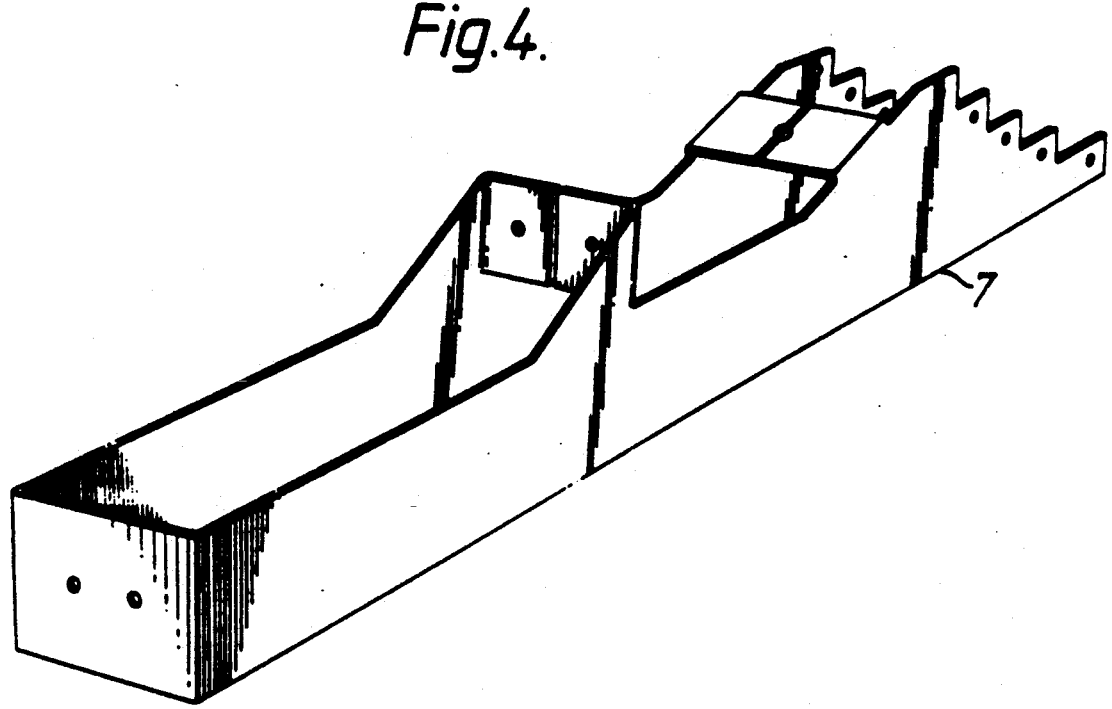
FIG. 4 shows a part of a prior art base for holding trays.

FIG. 4 shows a design of carrier 7 made from sheet material.

Figure 5:
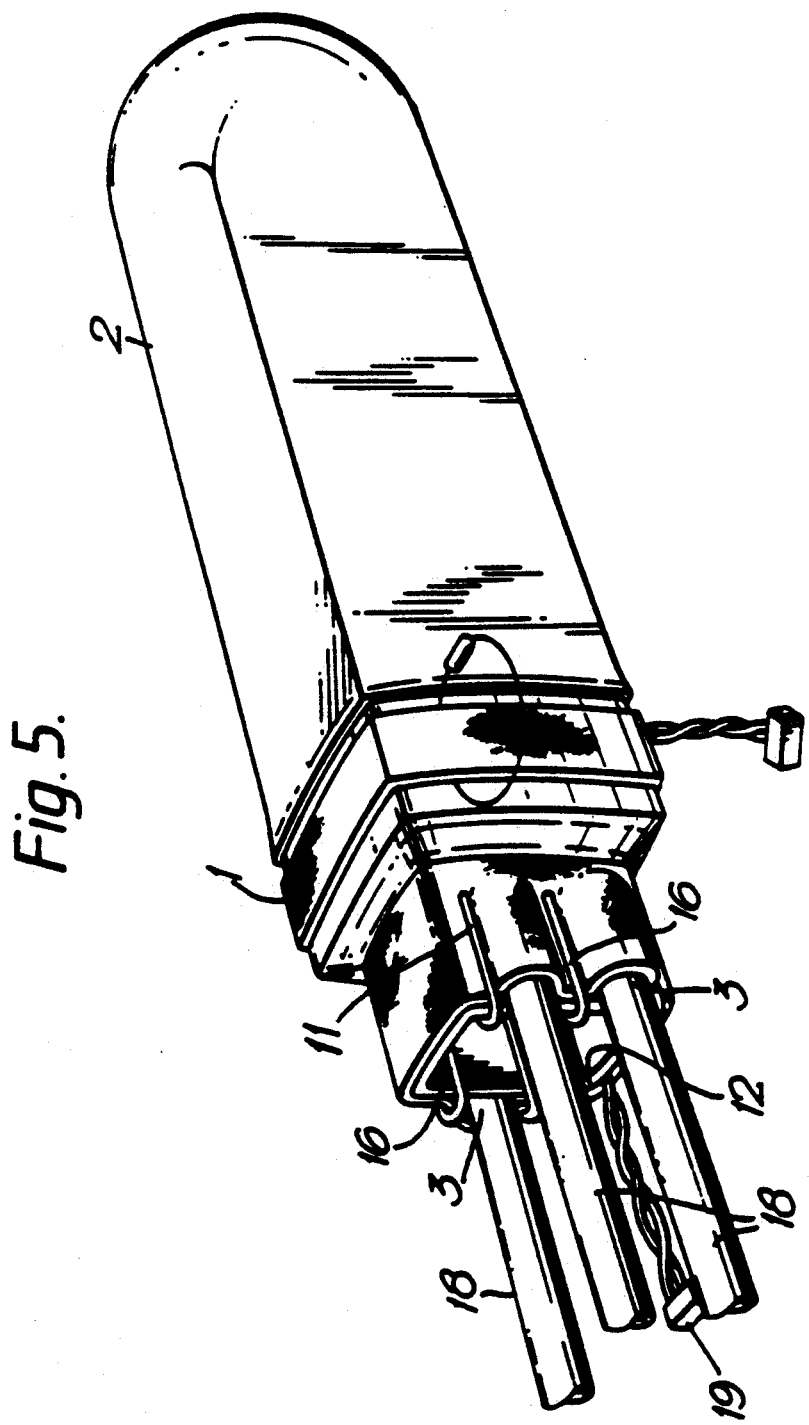
FIG. 5 shows a butt splice case employing branch-off clips and a junction box.

An alternative technique from that of FIG. 1 of sealing the cables at their points of entry is shown in FIG. 5. A series of branch-off clips 16 is used in conjunction with a junction box 17 to deform the outlet 3 to conform to the cables 18. The junction box is positioned within the outlet 3 and the cables pass between the box and the outlet. The branch-off clips cause the outlet to be deformed around the cables into proximity with the box. The outlet is again preferably heat-shrinkable. FIG. 5 shows a further preferred feature which may be used in any of the embodiments; the outlet 3 is shrinkable by self-contained heating means, particularly by an electrical heater which is shown powered via conductors 19. Also shown is a band which joins together base and dome portions of the splice case. This band, which may also be electrically heat-shrinkable, is provided with self-contained cutting means for re-entry into the splice case. A disadvantage of the use of one outlet 3 which is subdivided is that all cables are preferably installed in that outlet before recovery can be used to seal any of them. The independant outlets illustrated in FIG. 1 allow independant sealing of each cable, and therefore an initial partial installation, followed by addition of further cables at a later date. The embodiment of FIG. 5 could, however, be modified to allow for this by the use of blank plugs.

Figure 6:
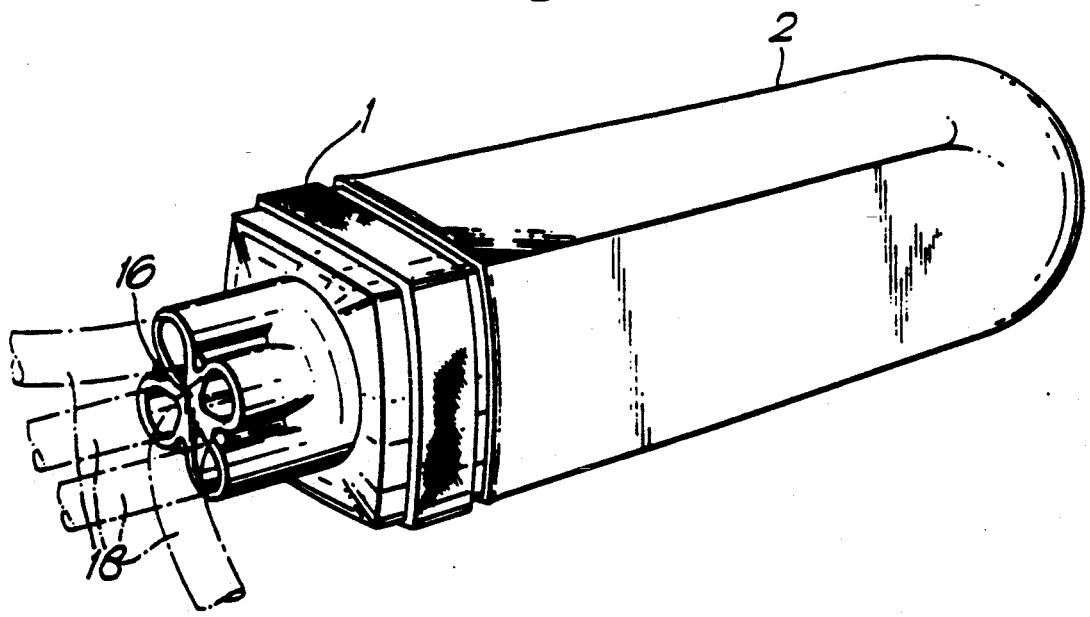
FIG. 6 shows a butt splice case employing branch-off clips.
Figure 7:
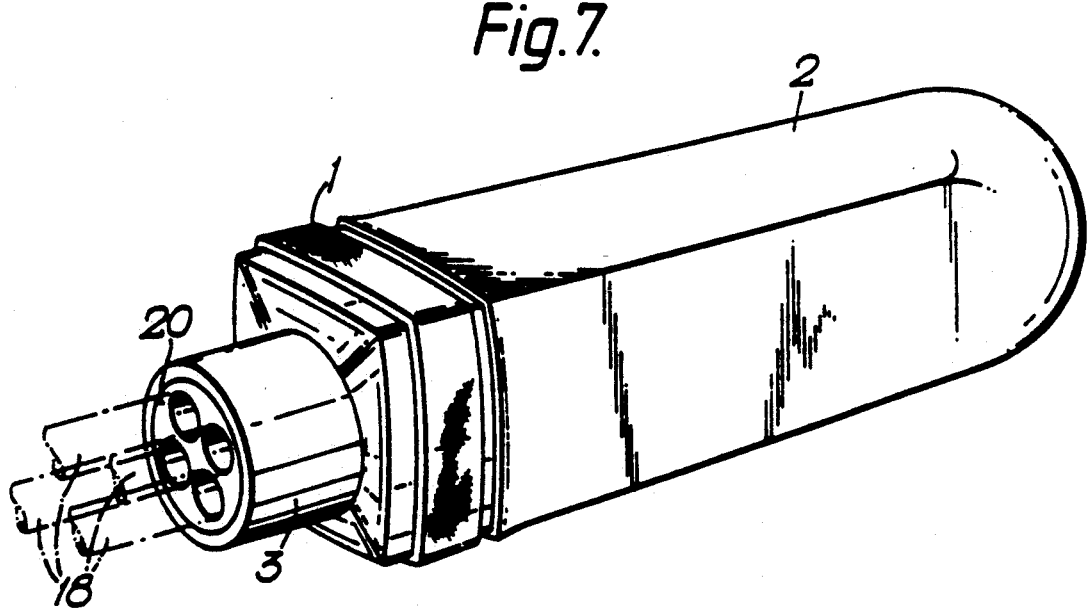
FIG. 7 shows the use of a flexible seal in a butt splice case.

FIGS. 6 and 7 show alternative ways of using one large outlet to seal several cables. In FIG. 6 a four legged branch-off clip or clips 16 is used, and in FIG. 7 a flexible seal 20 (such as that disclosed in GB 2124439) is used around the cables to change their combined re-entrant cross-sectional shape into a circular shape compatible with the circular shape of the outlet 3. As before, the outlets 3 are preferably heat-shrinkable, especially by electrical power.

Discrete electrically shrinkable outlets may be used, shrunk into engagement with the cables and projections on the base. The outlets in this case may be pre-shrunk onto such projections, leaving only shrinkage onto the cables to be performed in the field. Alternatively, the entire installation of the outlets could be performed in the field.

Figure 8:
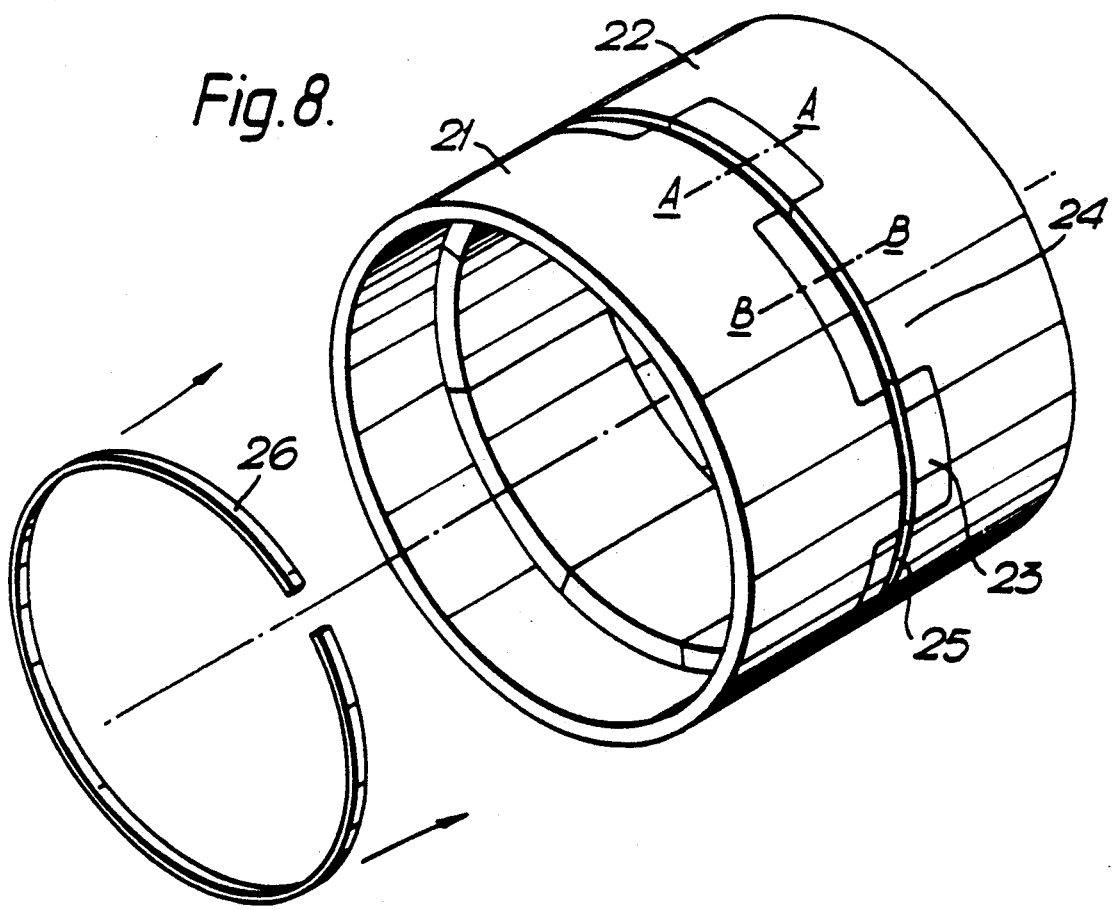
FIG. 8 shows a base and cover or joining device of the invention.

FIG. 8 shows an enclosure or joining device of the invention, which can be incorporated into the designs of FIGS. 1–7.

First and second hollow parts 21, 22 are joined together through first and second projections 23, 24 that mate in interdigitated fashion. The projections need not extend all around the circumference of the parts. The projections have recesses 25 therein, into which can be positioned some means 26 for preventing their separation. Such means 26 preferably comprises a ring, preferably a split ring, and preferably one that is resiliently deformable so that it can be snapped into the recesses 25. The ring may comprise any suitable material, including metal and plastics. The external surfaces of the parts 21, 22 that are adjacent are preferably substantially mutually flush, and the ring 26 preferably is flush with them or recessed.

The projections may prevent relative rotation of the parts 21, 22, and the ring 26 may prevent axial separation.

Figure 8A:
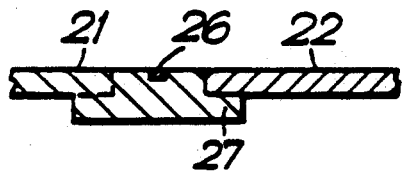
FIGS. 8a and 8b show cross sections along lines AA and BB, respectively, of FIG. 8.
Figure 8B:
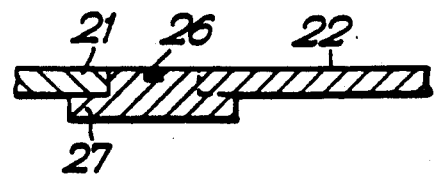

FIGS. 8A and 8B show sections along lines AA and BB respectively of FIG. 8. Part 21 can be seen to have a projection 27 such as a lip or flap that under lies part 22, and this may give the structure more stability where desired.

Figure 9:
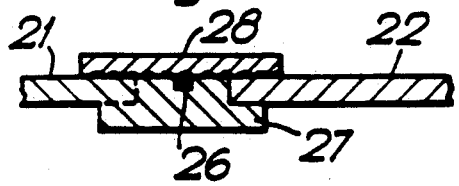
FIGS. 9 and 10 show a base and cover sealed together.

FIG. 9 shows a temporary seal 28 placed over any gap between parts 21 or 22, and comprising for example an elastomeric, for example rubber, sleeve which may be corrugated.

Figure 10:
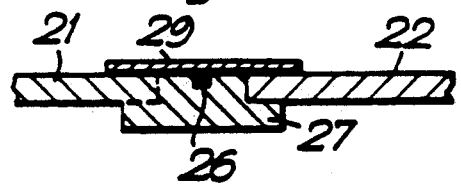

A more permanent seal may be provided using a dimensionally-recoverable sleeve 29 as shown in FIG. 10. Such a sleeve is preferably heat-shrinkable and may be coated on its internal surface with a heat-activatable adhesive. The sleeve may be electrically heat-shrinkable, and comprise for example a conductive polymer.

Figure 11:
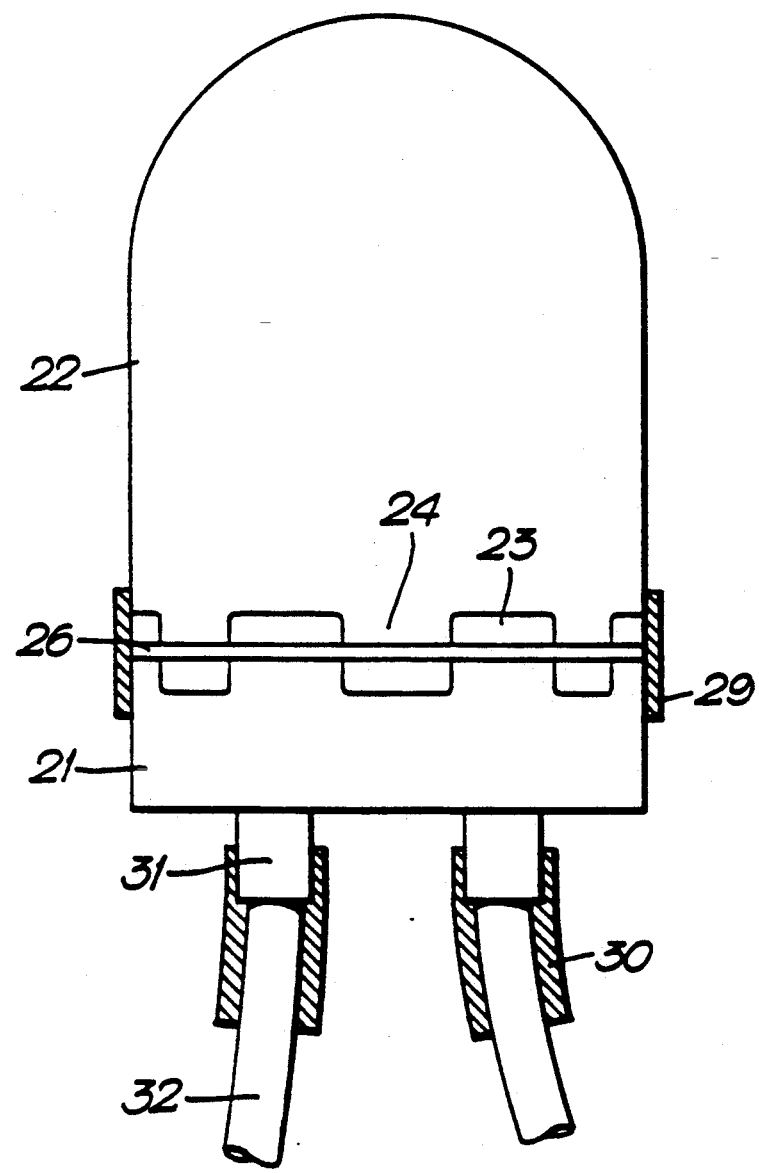
FIG. 11 shows an installed splice case of the invention.

FIG. 11 shows a cable splice enclosure, of butt design, particularly for optical fibre cables, and embodying the invention.

Here, the base of the enclosure comprises the first part 21, outlets 31 being integral with projection 23. Similarly, the cover which is preferably blind at one end, and especially is dome-shaped, is integral with projections 24. Each part 21, 22 may, however, comprise more than one component. Sealing sleeves 29 and 30 are shown in cross-section sealing the parts 21, 22 together and sealing cables 32 to the outlets 31.

For the avoidance of doubt it is noted that the invention provides a cable splice enclosure and a joining device and a method of sealing. Any of the features of shape, techniques of interconnection, internal components such as organizers disclosed herein may be selected for combination.

We claim:

1. A cable splice enclosure comprising:
   a base having an outlet capable of receiving a cable and
   a hollow cover which can be fixed to the base to close at least partially the enclosure such that the adjacent external surfaces of the base and cover lie substantially mutually flush:
   in which the base and cover have means which can present their separation, said means lying substantially flush with or below said adjacent said external surfaces, and in which the cover and the base have projections that can mate in interdigitated fashion.

2. An enclosure according to claim 1, in which a part of the base which has the outlet is integral with a part of the base which has one of said external adjacent surfaces.

3. An enclosure according to claim 1, in which a part of the cover which has one of said external adjacent surfaces is integral with a part that is substantially tubular and blind at one end.

4. An enclosure according to claim 1, in which said outlet comprises a dimensionally-recoverable sleeve.

5. An enclosure according to claim 1, additionally comprising an optical fibre splice organizer.

6. An enclosure according to claim 1, additionally comprising sealing means for sealing any gap between said adjacent external surfaces.

7. An enclosure according to claim 6, in which said means for sealing comprises a dimensionally-recoverable sleeve.

8. An enclosure according to claim 1, in which at least one said projection of the base and at least one said projection of the cover have means for receiving said means which can prevent.

9. A cable splice case enclosed by an enclosure according to claim 1.

10. A method of environmentally protecting a cable splice case by means of an enclosure which comprises:
    positioning a cable in a base having an outlet capable of receiving said cable;
    and fixing a cover on the base, said cover being a hollow cover which can be fixed to the base to close at least partially the enclosure such that adjacent external surfaces of the cover and base lie substantially mutually flush:
    in which the base and cover have means which can prevent their separation, said means lie substantially flush with or below said adjacent external surfaces, and wherein said means that can prevent comprises a ring, and the base and cover have generally cylindrical portions having one or more circumfertially-extending recesses therein, the ring being receivable in the one or more recesses, and in which the cover and the base have projections that can mate in interdigitated fashion.

11. A joining device which comprises a first hollow part having a generally cylindrical portion comprising first axially-extending projections, the projections having generally circumferentially-extending first recesses in external surfaces thereof;

a second hollow part having a generally cylindrical portion comprising second axially-extending projections, the projections having generally circumferentially-extending second recesses in external surfaces thereof; the first hollow part being capable of being fixed to the second hollow part with the first and second projections mated in interdigitated fashion, with the first and second recesses lying on a common circle; and a ring that can be positioned in the first and second recesses to prevent axial separation of the first and second parts.

12. A cable splice enclosure comprising:

a base having an outlet capable of receiving a cable; and a hollow cover which can be fixed to the base to close at least partially the enclosure such that adjacent external surfaces of the base and cover lie substantially mutually flush;

in which the base and cover have means which can prevent their separation, said means lying substantially flush with or below said adjacent external surfaces, and wherein said means that can prevent comprises a ring, and the base and cover have generally cylindrical portions having one or more generally circumferentially-extending recesses there, the ring being receivable in one or more recesses.

13. An enclosure according to claim 12, in which a part of the base which has the outlet is integral with part of the base which has one of said external adjacent surfaces.

14. An enclosure according to claim 12 in which a part of the cover which has one of said external adjacent surfaces is integral with a part which is substantially tubular and blind at one end.

15. An enclosure according to claim 12, in which said outlet comprises a dimensionally-recoverable sleeve.

16. An enclosure according to claim 12, additionally comprising an optical fibre splice organizer.

17. An enclosure according to claim 12, additionally comprising sealing means for sealing any gaps between said adjacent and external surfaces.

18. An enclosure according to claim 17, in which said means for sealing comprises a dimensionally-recoverable sleeve.

19. An enclosure according to claim 12, in which the cover and the base have projections that can mate in interdigitated fashion.

20. An enclosure according to claim 19, in which at least one of said projections of the base and at least one said projection of the cover have means for receiving said means which can prevent.

* * * * *

UNITED STATES PATENT AND TRADEMARK OFFICE
CERTIFICATE OF CORRECTION

PATENT NO. : 5,255,337
DATED : October 19, 1993
INVENTOR(S) : Theys et al

It is certified that error appears in the above-indentified patent and that said Letters Patent is hereby corrected as shown below:

Column 2, lin 9, replace "enclosure shaving" by--enclosure having--.
Column 8,
Claim 1, line 20, replace "cable" by--cable;--.

Claim 1, line 25, replace "flush:" by--flush;--.
Column 10,
Claim 12, line 5, , replace "there," by--therein,--.

Signed and Sealed this

Sixth Day of June, 1995

Attest:

BRUCE LEHMAN

Attesting Officer    Commissioner of Patents and Trademarks